(12) United States Patent
Fujii et al.

(10) Patent No.: US 8,165,059 B2
(45) Date of Patent: Apr. 24, 2012

(54) MULTI-HOP COMMUNICATION METHOD, A MULTI-HOP COMMUNICATION TERMINAL AND COMMUNICATION PROGRAM

(75) Inventors: Takeo Fujii, Fuchu (JP); Hiromasa Uchiyama, Fuchu (JP)

(73) Assignee: The University of Electro-Communications, Tokyo (JP)

( * ) Notice: Subject to any disclaimer, the term of this patent is extended or adjusted under 35 U.S.C. 154(b) by 703 days.

(21) Appl. No.: 12/223,260

(22) PCT Filed: Jan. 30, 2007

(86) PCT No.: PCT/JP2007/051884
§ 371 (c)(1),
(2), (4) Date: Sep. 15, 2008

(87) PCT Pub. No.: WO2007/086620
PCT Pub. Date: Aug. 2, 2007

(65) Prior Publication Data
US 2010/0232436 A1     Sep. 16, 2010

(30) Foreign Application Priority Data
Jan. 30, 2006   (JP) ................................. 2006-019907

(51) Int. Cl.
*H04B 7/14*     (2006.01)
(52) U.S. Cl. ........ 370/315; 370/319; 370/400; 370/492; 370/501
(58) Field of Classification Search .................. None
See application file for complete search history.

(56) References Cited

U.S. PATENT DOCUMENTS

| | | | | |
|---|---|---|---|---|
| 5,295,154 A | * | 3/1994 | Meier et al. | 370/351 |
| 6,128,512 A | * | 10/2000 | Trompower et al. | 455/561 |
| 6,728,233 B1 | * | 4/2004 | Park et al. | 370/342 |
| 2004/0029528 A1 | * | 2/2004 | Chandler | 455/12.1 |
| 2004/0132452 A1 | * | 7/2004 | Lee | 455/445 |
| 2005/0063483 A1 | * | 3/2005 | Wang et al. | 375/267 |
| 2007/0150928 A1 | * | 6/2007 | Hottinen | 725/127 |

(Continued)

FOREIGN PATENT DOCUMENTS

JP     H10-65601     3/1998

(Continued)

OTHER PUBLICATIONS

Fujii T. et al., "Multi-Band Ad-Hoc Cognitive Radio for Reducing Inter System Interference" 2006IEEE 17th International Symposium on Personal, Indoor and Mobile Radio Communications, Sep. 2006, pp. 1-5, "iv. Multi-Band Ad-Hoc Cognitive Radio".

(Continued)

*Primary Examiner* — Marsha D. Banks Harold
*Assistant Examiner* — Anthony Sol
(74) *Attorney, Agent, or Firm* — Manabu Kanesaka

(57) ABSTRACT

The degradation of the communication characteristics and the throughput of the entire network can be improved. The failures of sending and receiving are reduced and the transmission time is reduced. In a multi-hop communication method how the source terminal 11 transmits and receives the packets with destination terminal 12 through at least one relay terminal 13, the relay terminal 13 and/or the destination terminal 12 includes a table TBL of use channel candidates that is issued by the source terminal 11, and the relay terminal 13 and/or the destination terminal 12 selects a use channel for sending the data packets from the channel candidates registered in the table and sends the data packets.

11 Claims, 7 Drawing Sheets

U.S. PATENT DOCUMENTS

2009/0176453 A1* 7/2009 Wilhelmsson et al. ...... 455/41.2

FOREIGN PATENT DOCUMENTS

| JP | 2004-336455 | 11/2004 |
| --- | --- | --- |
| JP | 2005-277833 | 10/2005 |
| WO | WO 2004/105409 | 12/2004 |

OTHER PUBLICATIONS

Fujii T. et al., "Ad-Hoc Cognitive Radio-Development to Frequency Sharing System" by Using Multi-Hop Network, IEEE International Symposium on New Frontiers in Dynamic Spectrum Access Networks, Nov. 8, 2005, pp. 5L89-592; "IV. Ad-Hoc Frequency Sharing System Using STBC Distributed ARQ".

The Institute of Electronics, Information and Communication Engineers, Technical Report, Takeo Fujii et al., SR2005-9(May 2005) pp. 59-66, "Ad-hoc Cognitive Radio Cooperated with MAC Layer".

Inter System Interference Evaluation between Primary Systems and Ad-hoc Cognitive Radio, Takeo Fujii, Yukihiro Kamiya, and Yasuo Suzuki, Department of Electrical and Electronic Engineering, Graduate School of Engineering, Tokyo University of Agriculture and Technology, 2-24-16, Nakacho, Koganei-shi, Tokyo, 184-8588, Japan, Mar. 2006.

Multi-Band Ad-Hoc Cognitive Radio for Reducing Inter System Interference, Takeo Fujii, Yukihiro Kamiya, Yasuo Suzuki, The University of Electro-Communications, 1-5-1, Chofugaoka, Chofu, Tokyo, 182-8585, Japan, Tokyo University of Agriculture and Technology, 2-24-16, Nakacho, Koganei, Tokyo, 184-8588, Japan, Sep. 2006.

Ad-hoc Cognitive Radio, Development to Frequency Sharing System by using Multi-hop Network, Takeo Fujii, Yasuo Suzuki, Tokyo University of Agriculture and Technology, 2-24-16, Nakacho, Koganei, Tokyo, 184-8588, Japan, Nov. 8, 2005.

* cited by examiner (A)

(A) TBL1 — Table Memory (104)

| Retransmission Number of Times | Frequency |
|---|---|
| 0 | f2 |
| 1 | f14 |
| 2 | f8 |
| 3 | f3 |
| 4 | f10 |
| 5 | f4 |
| ⋮ | ⋮ |
| 11 | f13 |

(C) TBL3 — Table Memory (104)

| Retransmission Number of Times | Pattern |
|---|---|
| 0 | 5 |
| 1 | 20 |
| 2 | 3 |
| 3 | 6 |
| 4 | 12 |
| 5 | 8 |
| ⋮ | ⋮ |
| 11 | 1 |

(E) TBL5 — Table Memory (104)

| Retransmission Number of Times | Timeslot |
|---|---|
| 0 | s6 |
| 1 | s5 |
| 2 | f3 |
| 3 | s9 |
| 4 | s1 |
| 5 | s12 |
| ⋮ | ⋮ |
| 11 | s7 |

(B) TBL2 — Table Memory (104)

| Adoption Rank Order | Frequency |
|---|---|
| 1 | f1 |
| 2 | f2 |
| 3 | f3 |
| 4 | f4 |

(D) TBL4 — Table Memory (104)

| Adoption Rank Order | Pattern |
|---|---|
| 1 | 1 |
| 2 | 2 |
| 3 | 3 |
| 4 | 4 | ns, wired networks. In ad-hoc networks, the networks
MULTI-HOP COMMUNICATION METHOD, A MULTI-HOP COMMUNICATION TERMINAL AND COMMUNICATION PROGRAM

TECHNICAL FIELD

This invention relates to a multi-hop communication method and a multi-hop communication terminal for transmitting packets from a source terminal to a destination terminal through plural relay terminals by distributed automatic repeat request to improve the communication characteristics.

BACKGROUND ART

Attention has been recently focused on the ad-hoc networks in which plural wireless terminals communicate each other without relying on particular infrastructure, e.g. base stations, wired networks. In ad-hoc networks, the networks are easily and flexibly formed by using a multi-hop communication through a relay terminal between the terminals that cannot communicate each other directly while using a direct communication between the terminals within the common communication coverage.

As shown in FIG. 7, when a source terminal 21 and a destination terminal 22 initiate a multi-hop communication through the relay terminals 23, and if a system on the shortest path between the source terminal 21 and the destination terminal 22 is communicating (In FIG. 7, a case of communication between the source terminal 31 and the destination terminal 32), it will detour around a communication path. If an ordinary multi-hop communication is performed in this case, hop count is increased and therefore the increment of time to arrive packets and the occupation of channel becomes a problem.

In an ad-hoc network, a distributed ARQ (Automatic Repeat reQuest) method can be employed, and even if signals failed to be received, various kinds of information obtained at the time are stored and a retransmitted signal and the stored signal can be combined (See Japanese patent application laid-open TOKUHYO 2001-518725).

According to a distributed ARQ method where packet transmission from the source terminal through the relay terminals distributed around is repeated until it arrives at the destination terminal, the relay terminals autonomously form a transmission route (that is, without forming a route beforehand) and perform repeating in accordance with packet retransmission by the source terminal. The error is reduced because the relay terminal can receive packets from plural terminals.

In an ordinary system for sending a same packet using a distributed ARQ method, when the signals for the same packet received from two terminals are in opposite phase, the gain of the wireless communication decrease significantly. As a method for improving the wireless communication characteristics, a method for combining plural signals by applying antenna diversity technique for transmitting packets by plural antennas to distributed terminals in an ad-hoc network has been studied (See Kojima Erina, Fujii Takeo, Kamiya Yukihiro, Suzuki Yasuo "Distributed ARQ using STBC for OFDM ad-hoc networks" Shingaku-gihou, June 2004, RCS2004-77, pp. 7-12). As one of the antenna diversity techniques, STBC (Space Time Block Coding) is known.

In STBC techniques, it is possible to obtain a diversity gain at a receiving side by simultaneously sending differently encoded packets from plural transmitting antennas respectively. It is known to apply a multi-hop communication to Cognitive Radio for effectively using the spatially vacant frequencies. Cognitive Radio technique allows a terminal to autonomously find the vacant frequencies in the frequency band allocated to other systems. e.g. terrestrial broadcasting, and initiate communication.

However even if a multi-hop communication characteristics can be improved by the technique of "Distributed ARQ using STBC for OFDM ad-hoc networks" by Kojima Erina, Fujii Takeo et al., what it detours around is unchanged, the delay and channel occupation problems remain unresolved and there is a limitation to improve the throughput of the entire network. The failure of transmit and receive can be reduced by the technique described in TOKUHYO 2001-518725, however the transmission time cannot be shortened.

A purpose of the present invention is to provide a multi-hop communication method and a multi-hop communication terminal for improving the throughput of the entire network while improving the degradation of the communication characteristics in the circumstance where the packet transmission characteristics degrades because interference exists in the shortest path.

Another purpose of the present invention is to provide a multi-hop communication method, a multi-hop communication terminal and program which can shorten the transmission time while reducing failures of transmit and receive.

DISCLOSURE OF INVENTION

The multi-hop communication method according to the present invention is characterized in (1)-(9).
(1) A multi-hop communication method how the source terminal transmits and receives the packets with destination terminal through at least one relay terminal, wherein the relay terminal and/or the destination terminal includes a table of use channel candidates that is issued by the source terminal, the relay terminal and/or the destination terminal selects a use channel for sending the data packets from the channel candidates registered in the table and sends the data packets.
(2) A multi-hop communication method according to (1) comprising:
the packets are sent by the distributed Automatic Repeat reQuest method that is the packets are retransmitted repeatedly from the source terminal to destination terminal via the relay terminal distributed around,
wherein
the relay terminal autonomously forms a transmission route and retransmits in response to the packet retransmission from the source terminal.
(3) A multi-hop communication method according to (2) for sending the packets by a space time block coding method.
(4) A multi-hop communication method according to either one of (1) to (3) comprising:
the source terminal selects a use channel from the channel candidates registered with the table, and send the data packets.
(5) A multi-hop communication method according to either one of (1) to (4) comprising:
the destination terminal has the table and the destination terminal sends an ACK (Acknowledgement) packet or a NACK (Negative Acknowledgement) packet to the source terminal through the relay terminal,
wherein the destination terminal selects a use channel from the use channel candidates registered in the table, and sends the confirmation packet, and the relay terminal selects a use channel from the channel candidates registered in the table and sends the confirmation packet.
(6) A multi-hop communication method according to either one of (1) to (5) comprising: the use channel candidates are frequency candidates, the candidates of sub-carrier pattern and the candidates of timeslot that are used for data transmission.

(7) A multi-hop communication method according to either one of (1) to (6) comprising; a predetermined number of the relay terminals work as branches for cooperative diversity by space time block coding.

(8) A multi-hop communication method according to either one of (1) to (7) comprising: the table is included in the packet and sent from the source terminal to the relay terminals and to the destination terminal.

(9) A multi-hop communication method according to either one of (1) to (8) comprising: a adoption rank order of the use channel candidates is included in the table, and the relay terminals, the destination terminal or the source terminal select a channel from the use channel candidates according to the adoption rank order.

The multi-hop communication terminal according to the present invention is characterized in (10).

(10) A multi-hop communication terminal comprising: source terminal, a destination terminal or a relay terminal include a channel scanning section, a use channel candidate determining section, a table flaming section, a table memory, a table implanting section, a table extracting section, a use channel selecting, a transmitter section and a receive section, and being used as a source terminal, a destination terminal or a relay terminal, wherein, the channel scanning section scans the receiving radio wave and detects the channel which the surrounding system use when the multi-hop communication terminal functions as the source terminal, the destination terminal or the relay terminal, the use channel candidate determining section determines the use channel candidates based on the scan result of the channel scanning section when the multi-hop communication terminal functions as the source terminal, the table flaming section makes a table to refer to the channel determined by the use channel candidate determining section when the multi-hop communication terminal functions as the source terminal or the destination terminal, the table memory stores the table made by the table flaming section when the multi-hop communication terminal functions as the source terminal, while the table memory stores the table extracted by the table extracting section when the multi-hop communication terminal functions as the relay terminal or the destination terminal, the table implanting section implants the table made by the table flaming section in a packet when the multi-hop communication terminal functions as the source terminal, and transmits the packet to another multi-hop communication terminal functioning as the relay terminal or the destination terminal, the table extracting section extracts the table from the packet received from another multi-hop communication terminal functioning as a source terminal, when the multi-hop communication terminal functions as the relay terminal or the destination terminal, and the use channel selecting section selects a use channel from the table stored in the table memory when the multi-hop communication terminal functions as the source terminal, the relay terminal or the destination terminal.

The multi-hop communication program according to the present invention is characterized in (11).

(11) A multi-hop communication program loaded in a multi-hop communication terminal used as a source terminal, a relay terminal or a destination terminal, a multi-hop communication program comprising:

a channel scanning step, a use channel candidate determining step, a table flaming step, a table storage step, a table implanting step, a table extracting step, a use channel selecting step, transmitting step and receiving step, wherein in the channel scanning step, the receiving radio wave is scanned and the channel which the surrounding system use is detected when the multi-hop communication terminal functions as the source terminal, the destination terminal or the relay terminal, in the use channel candidate determining step, the use channel candidate is determinated based on the scan result of the channel scanning step when the multi-hop communication terminal functions as the source terminal, in the table flaming step, making a table for referring to the channel determined by the use channel candidate determining step when the multi-hop communication terminal functions as the source terminal or the destination terminal, in the table storage step, storing the table made by the table flaming step when the multi-hop communication terminal functions as the source terminal and storing the table extracted by the table extracting step when the multi-hop communication terminal functions as the relay terminal or the destination terminal, in the table implanting step, implanting the table made by the table flaming step in a packet when the multi-hop communication terminal functions as the source terminal and transmitting the packet to another multi-hop communication terminal functioning as the relay terminal or the destination terminal, in the table extracting step, extracting the table from the packet received from another multi-hop communication terminal functioning as a source terminal when the multi-hop communication terminal functions as the relay terminal or the destination terminal, and in the use channel selecting step, selecting a use cannel from the table stored in the table memory when the multi-hop communication terminal functions as the source terminal, the relay terminal or the destination terminal.

According to the present invention, at least a source terminal includes a table of the use channel candidates made by the source terminal. Therefore, even if the relay terminal must cancel the communication and must detour around a communication path so that there are the interferences of the existing systems in the shortest communication path when a certain use channel candidate (e.g. candidate frequency, candidate sub carrier pattern, candidate time slot) is going to be used, the transmission of the packet is enabled without detouring around a communication path by using the use channel candidate that there is not the interferences in accordance with adoption rank order or by selecting at random.

In particular, a multi-hop communication method of the present invention employing a distributed ARQ and employing a distributed ARQ by STBC can transmit packets to a destination terminal without determining the route in advance. In other words, since the route is not established in the source terminal, there is no information on the surrounding. So, the source terminal makes a table that registers the use channel candidate (a priority table or a direction table for every retransmission), inserts the table in packets, and send the packets to the relay terminals and the destination terminal.

A. The relay terminal checks the channel condition and determines the transmission channel autonomously.

B. The relay terminal determines the channel depending on the number of retransmission from the source terminal. If the channel is unused the source terminal can send the packets using the channel.

A multi-hop communication terminal according to the present invention can be used as a source terminal, a relay terminal or a destination terminal for practicing the above mentioned multi-hop communication method.

BRIEF DESCRIPTION OF DRAWINGS

FIG. 3 (A)-(E) shows an exemplary channel table used in the present invention.

IMPLEMENTATION EXAMPLE FOR CARRYING OUT THE INVENTION

Figure 1:
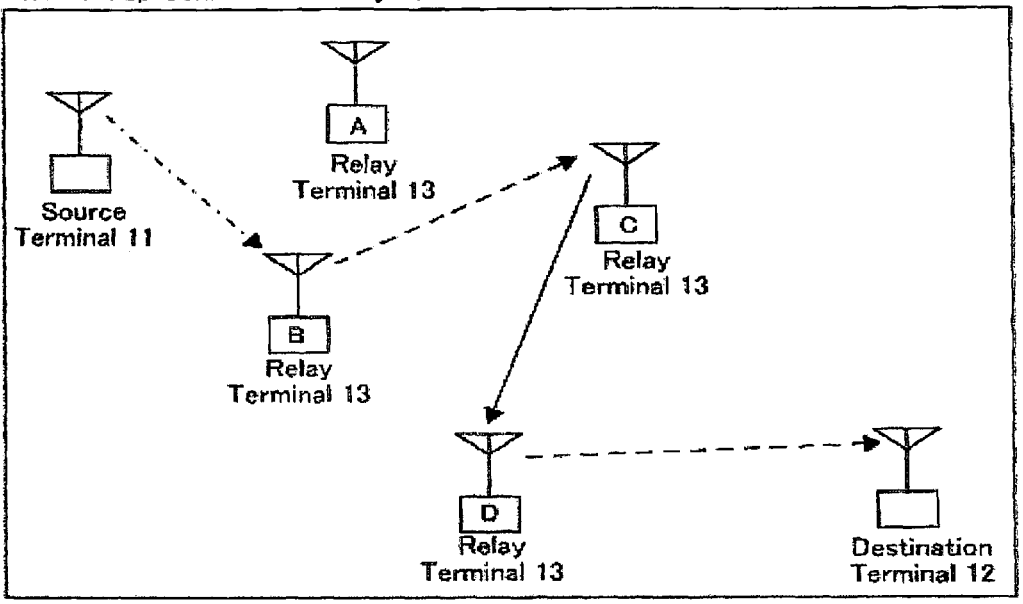
FIG. 1 shows an illustration diagram of a system for implementing a multi-hop communication method according to the present invention. (A) shows the case of performing a general multi-hop communication method. (B) shows the case of performing a multi-hop communication method using STBC.
Figure 1:
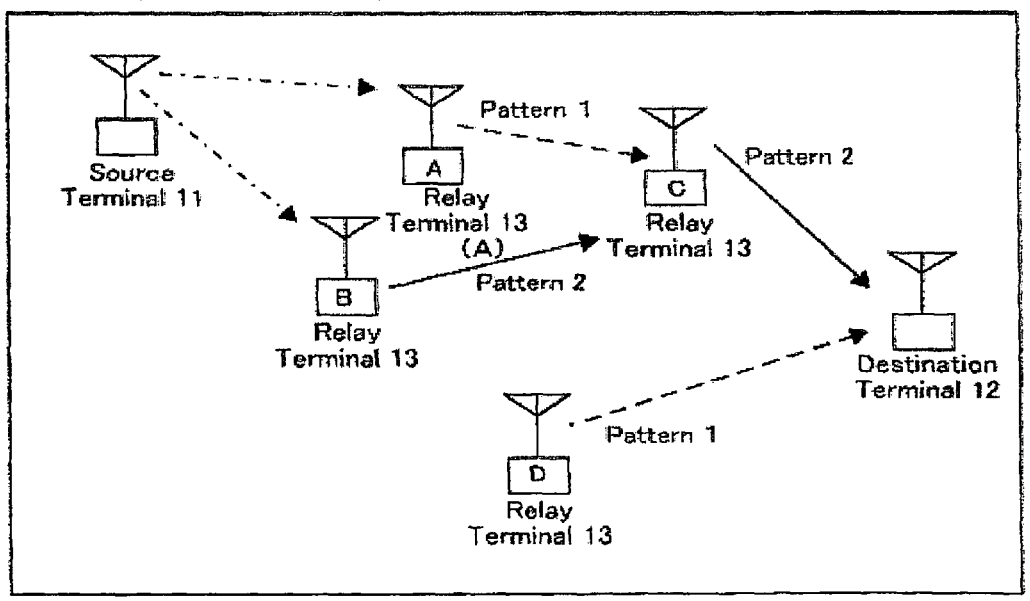

FIGS. 1 (A) (B) shows a system for practicing a multi-hop communication method according to the present invention, (A) shows a case of general multi-hop communication, and (B) shows a case of multi-hop communication using terminal cooperative diversity such as STBC, for example.

In the multi-hop communication system of FIGS. 1 (A) (B), a source terminal 11, a destination terminal 12, and relay terminals A, B, C, D (13) are shown. In FIG. 1 (B) (using terminal cooperative diversity), a pair of the relay terminals A, B and a pair of the relay terminals C, D function as a cooperative diversity respectively, and the relay terminals A and B and the relay terminals C and D function as branches for cooperative diversity.

In a multi-hop communication method according to the present invention, it does not matter whether or not a distributed ARQ communication method is employed. The distributed ARQ communication method will be explained later (see FIGS. 4, 5 and 6).

In FIG. 1, the source terminal 11, the destination terminal 12 and the relay terminal 13 do not need to have an identical configuration. For example, at least one of the source terminal 11, the destination terminal 12 and the relay terminal 13 can be a base station (or a gateway) and others can be portable terminals.

Figure 2:
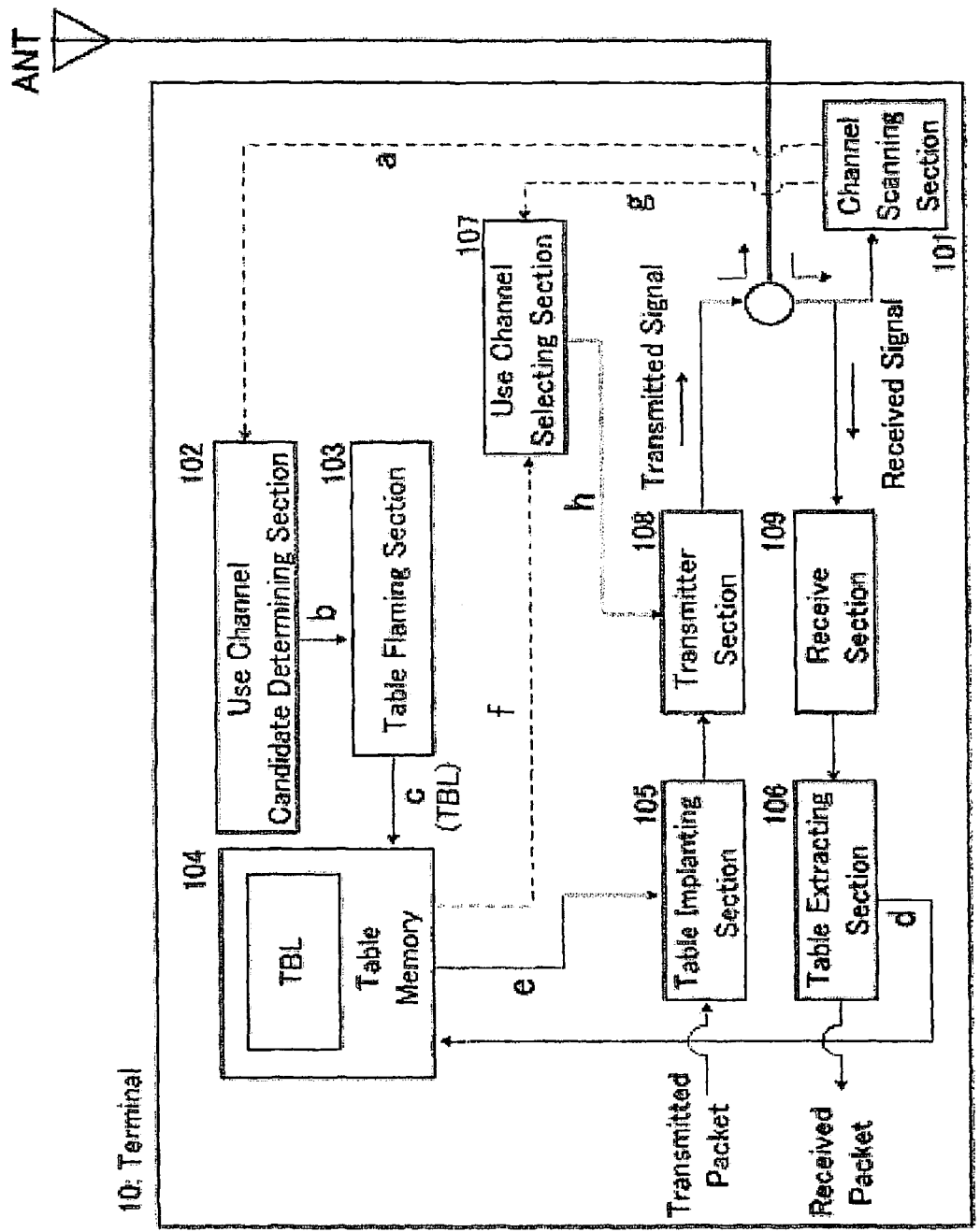
FIG. 2 shows a functional block diagram of a multi-hop communication terminal that can be used as either a source terminal, a destination terminal or a relay terminal.

FIG. 2 shows a functional block of the multi-hop communication terminal 10 that can be used for any of the source terminal 11, the destination terminal 12 and the relay terminal 13.

The multi-hop communication terminal 10 comprises a channel scanning section 101, a use channel candidate determining section 102, a table flaming section 103, a table memory 104, a table implanting section 105, a table extracting section 106, a use channel selecting section 107, a transmitter section 108 and a receive section 109.

The hardware block of the multi-hop communication terminal 10 includes a controller circuit (CPU, etc.), memories (RAM, ROM) and a transmitter-receiver circuit (LSI). It is not shown in the drawing because a person skilled in the art can easily understand the correspondence of the functional blocks 10 with the hardware blocks of the multi-hop communication terminal. The channel scanning section 101 scans the radio wave that is received through the antenna ANT and the receive section 109, and detects the channel which the existing system (the wireless system operating in the surroundings) uses. The channel includes a frequency, a sub-carrier pattern, a time slot, etc.

The use channel candidate determining section 102 determines the use channel candidate based on the scan result (a) of the channel scanning section 101 when the multi-hop communication terminal 10 functions as the source terminal 11.

The table flaming section 103 receives the channel candidate from the use channel candidate determining section 102 (b), and makes the table TBL when the multi-hop communication terminal 10 functions as the source terminal 11.

When the channel is a frequency division, the table flaming section 103 makes the table TBL1 shown in FIG. 3(A) from the use channel candidate that was determined by the use channel candidate determining section 102.

In FIG. 3 (A), twelve use channel candidates that were randomly selected are registered in the table TBL1.

In case of the multi-hop communication method which employed a distributed ARQ, the use channel changes at each data packet retransmission according to the table TBL1. The retransmission number of times in TBL1 means the number of times of data packet retransmission from the source terminal.

In case of the multi-hop communication method which does not employed a distributed ARQ (a multi-hop communication with predetermined route), the use channel changes by a hop number (a hop number from the transmission start at the source terminal to the arrival at the relay terminal) according to the table TBL1. In this case, "the retransmission number of times" in FIG. 3 (A) corresponds to "a hop number" (It is also the same case of "the retransmission number of times" in FIGS. 3 (C) and (E).

For example, the number of the candidate frequency is assumed four, a frequency candidate of the predetermined number (here, 4) can be repeatedly used, as data packet retransmission is performed from $0^{th}$ to $3^{rd}$ by using four frequency, and retransmission of $4^{th}$ to $7^{th}$ is used frequency candidate used for the $0^{th}$ retransmission to the $3^{rd}$ retransmission again.

Each terminal can autonomously determine the frequency for each transmission according to the adoption rank order indicated in the table respond to the interference status by associating the adoption rank order with the use frequency candidate instead of changing the use frequency for each retransmission.

In this case, the table framing section 103 can make the table TBL2 with the adoption rank order shown in FIG. 3(B) from the frequency determined by the use channel candidate determining section 102.

Four frequencies f1, f2, f3 and f4 are registered in the table TBL2 following the order by the adoption rank order. According to this embodiment, the greater the strength of the received scaned frequency is, the lower the adoption rank order is. It is because the larger the channel interference is, the greater the received signal strength is.

When the channel is the sub-carrier pattern of the OFDM, the table framing section 103 can make the table TBL3 shown in FIG. 3(C) from the sub-carrier pattern of an OFDM determined by the use channel candidate determining section 102.

In FIG. 3(C), the randomly selected twelve sub-carrier patterns (shown in integer) are registered and the sub-carrier pattern changes for each retransmission of data packets. In this case, four sub-carrier patterns can be reused for data packet retransmission of more than four times. The table framing section 103 can make the table TBL4 with the adoption rank order shown in FIG. 3(D) from the sub-carrier pattern determined by the use channel candidate determining section 102.

In FIG. 3(D), the greater the signal strength of the sub-carrier pattern used by the existing system is, the lower the adoption rank order is.

When the channel is a time slot, the table framing section 103 can make the table TBL5 shown in FIG. 3(E) from the time slot determined by the use channel candidate determining section 102. In FIG. 3(E), the randomly selected twelve time slots are registered and the used time slot changes for each retransmission of data packets. In this case, a predetermined number of time slots can be reused.

The table memory 104 stores the table TBL made by the table framing section 103 when the multi-hop communication terminal 10 functions for the source terminal 11 ($c$), and stores the table TBL made by the table framing section 103 in another multi-hop communication terminal functioning as the source terminal by receiving directly or by multi-hop through the receive section 109 and the table extracting section 106 when the multi-hop communication terminal 10 functions for the relay terminal 13 or the destination terminal 12 ($d$). That is, the table memory 104 stores the table TBL written in the data packet header and the table TBL written in the control packet that received through the receive section 109.

The destination terminal 12 is supposed to receive packets from the destination terminal 12 just before sending ACK packet (referred as "ACK" hereinafter) to the source terminal 11 through the relay terminal 13.

Therefore it is not necessary to store the table TBL in this case because the destination terminal 12 can most likely send ACK to the relay terminal 13 using the frequency used at this time.

However there is a possibility of interference with this existing system or other existing systems even when the destination terminal 12 uses the frequency that the destination terminal 12 just before that used as having no interference. Therefore the table memory 104 usually stores the table TBL received through the receive section 109 even when the multi-hop communication terminal 10 sends ACK as the destination terminal 12, and ACK is sent by determining a use channel based on this table TBL.

The table implanting section 105 implants the table TEL made by the table framing section 103 in a packet when the multi-hop communication terminal 10 functions as the source terminal 11 ($e$), and sends it to the relay terminal 13 or another multi-hop communication terminal functioning as the destination terminal 12.

The table extracting section 106 can extract the table TBL from the packet (a data packet in this embodiment) received by the receive section 109 when the multi-hop communication terminal 10 functions as the relay terminal 13 or the destination terminal 12.

The use channel selecting section 107 determines a use channel by referring to the table TBL (f) and scanning by the channel scanning section 101 ($g$). The same channel can be used continuously until receiving an ACK when the multi-hop communication terminal 10 functions for the source terminal 11. The use channel can be changed according to the order listed in the table for each data packet retransmission when the distributed ARQ is applied to the communication.

The use channel selecting section 107 can change the use channel for each retransmission according to the order listed in the table when the multi-hop communication terminal 10 functions for the destination terminal 12 or the relay terminal 13. Also, the use channel can be changed randomly or based on the order designated in the table for each data packet retransmission when a distributed ARQ technique is applied to the communication.

An interference free channel can be selected according to the order listed in the table based on the interference condition obtained by the channel scanning section 101 so that the terminal autonomously avoids the existing system. In this way, the transmitter section 108 can send data packets and control packets using a selected channel (h).

Figure 4:
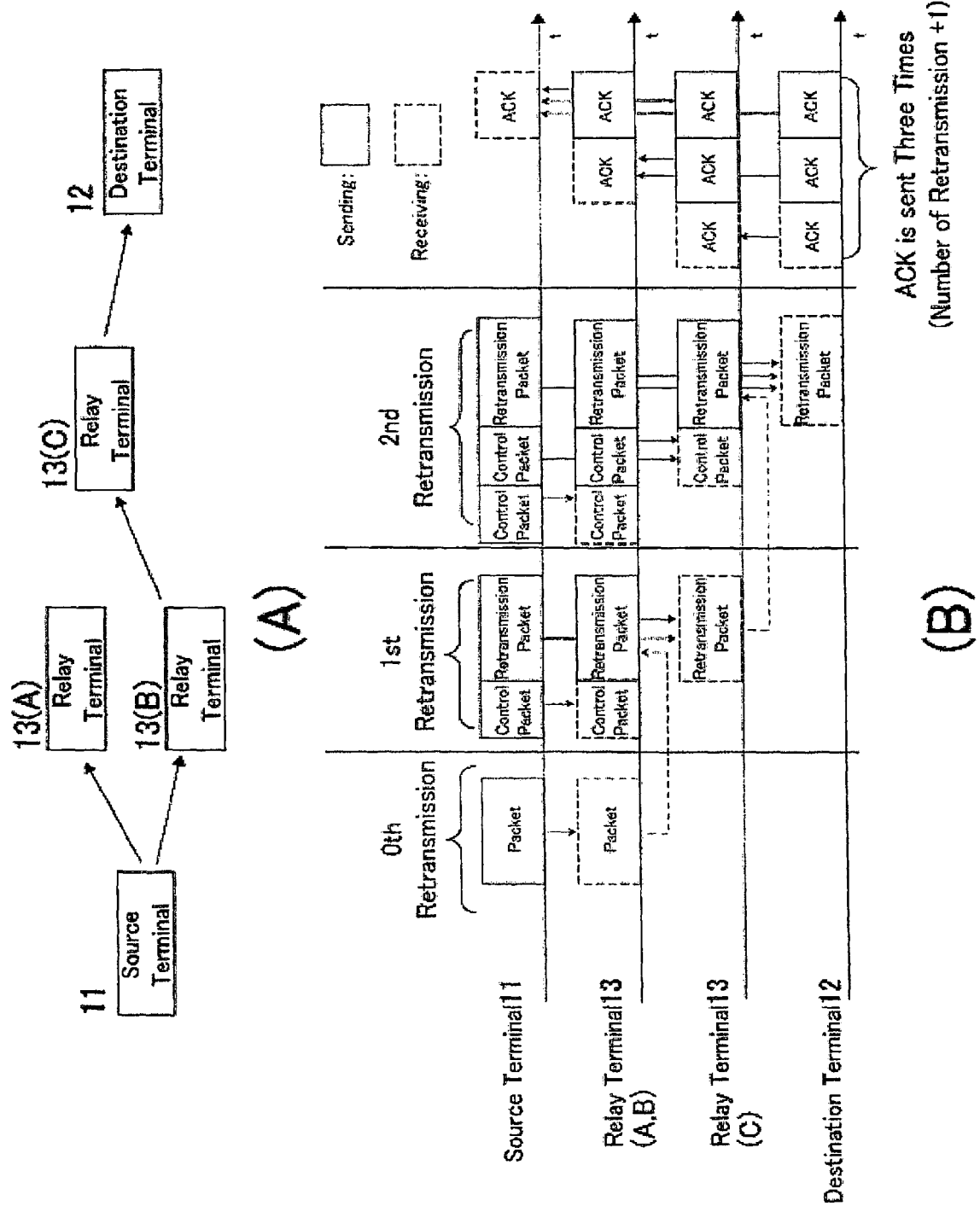
FIG. 4 shows an example of multi-hop communication system in distributed ARQ. (A) is an overview of the system. (B) is a timing chart for packet transmit and receive.

FIG. 4 shows an example of a distributed ARQ based multi-hop communication system. The drawing (A) shows the overview of the system. The drawing (B) shows a timing chart of packet sending and receiving.

<<Operation of the Source Terminal 11 at Data Transmission>>

The source terminal 11 sends i control packets and one data packet at $i^{th}$ retransmission as explained below. FIG. 4(B) shows the case of receiving the ACK at second retransmission and no retransmission for third and later.

First transmission ($0^{th}$ retransmission): a data packet $1^{st}$ retransmission: a control packet+a data packet $2^{nd}$ retransmission: a control packet+a control packet+a data packet

. . .

$i^{th}$ retransmission: a control packet+ . . . +a control packet+a data packet <<Operation of the Relay Terminal 13 During Data Relay>>

The relay terminal 13 (shown as "A", "B", "C" in FIGS. 4(A),(B)) sends (j−2) control packets and one data packet at $j^{th}$ retransmission. FIG. 4(B) shows the case where the relay terminals A and B end the process at the $3^{rd}$ data packet receiving and the relay terminals C ends the process at the $2^{nd}$ data packet receiving.

$1^{st}$ data packet receiving: no sending $2^{nd}$ data packet receiving (receiving one control packet in the same frame): a data packet $3^{rd}$ data packet receiving (receiving two control packets in the same frame): a control packet+a data packet

. . .

$i^{th}$ data packet receiving (receiving (j−1) control packets in the same frame): a control packet+ . . . +a control packet+a data packet <<Operation of the Destination Terminal 12 During Data Receiving The destination terminal 12 sends ACK for (R+1) times when data packets are received. "R" is the number of retransmission of the source terminal 11 at the time of data packet receiving. FIG. 4(B) shows the case of R=2 and ACK is sent three times.

<<Operation of the Relay Terminal 13 During ACK Relay>>

The relay terminal 13 sends (k−1) ACKs at $k^{th}$ ACK receiving. FIG. 4(B) shows the case of sending ACK twice at $3^{rd}$ ACK receiving for the relay terminal C.

$1^{st}$ ACK receiving: no sending $2^{nd}$ ACK receiving: ACK $3^{rd}$ ACK receiving: ACK+ACK

. . .

$k^{th}$ ACK receiving: ACK+ . . . ACK+ACK

Figure 5:
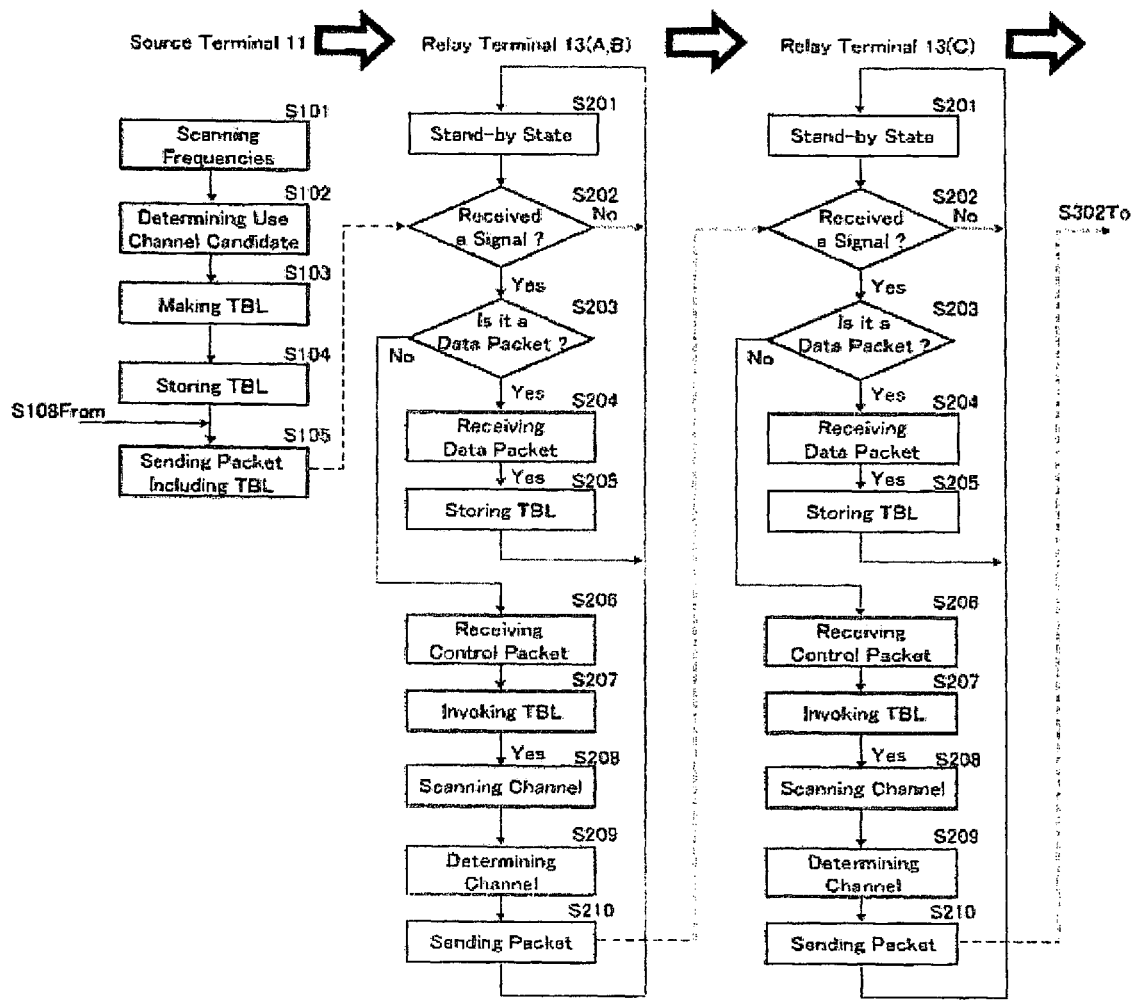
FIG. 5 is a flow chart for a first-half of a multi-hop communication method according to the present invention.
Figure 6:
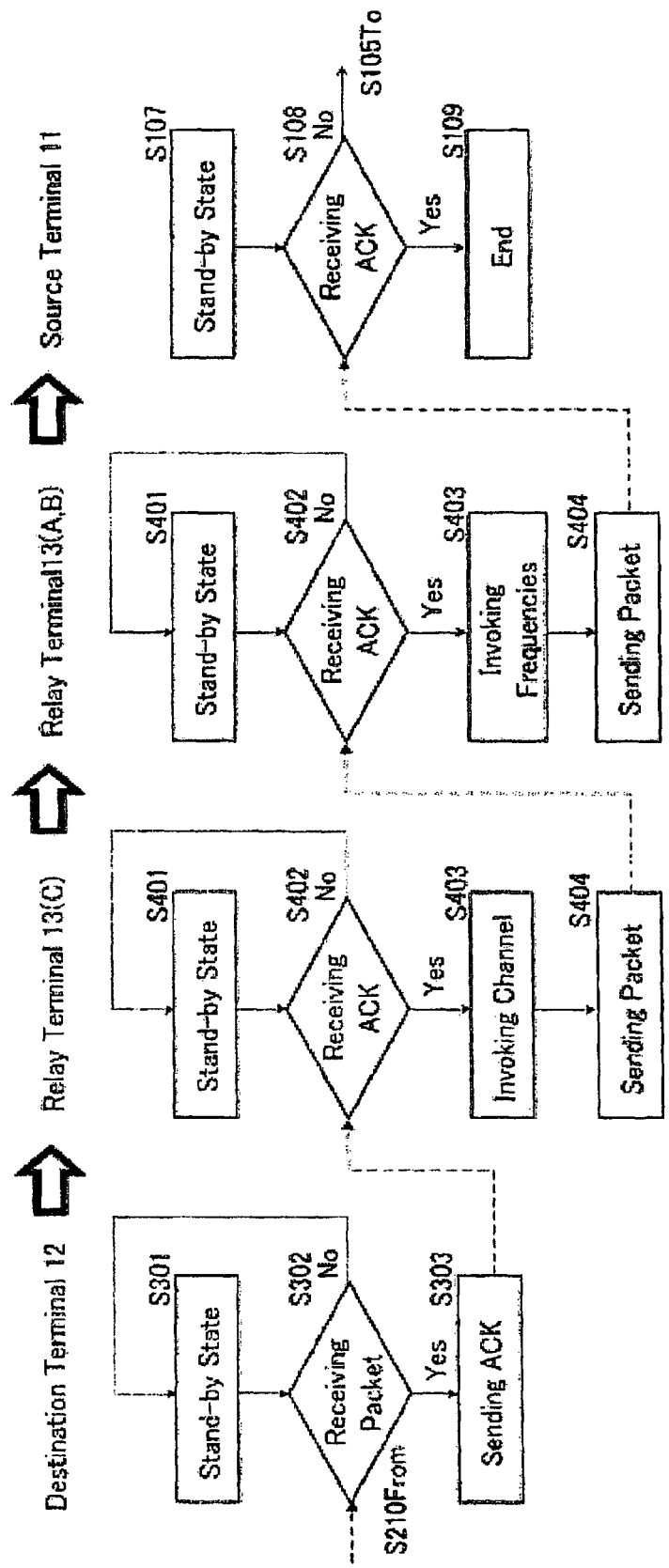
FIG. 6 is a flow chart for a second-half of a multi-hop communication method according to the present invention.
Figure 7:
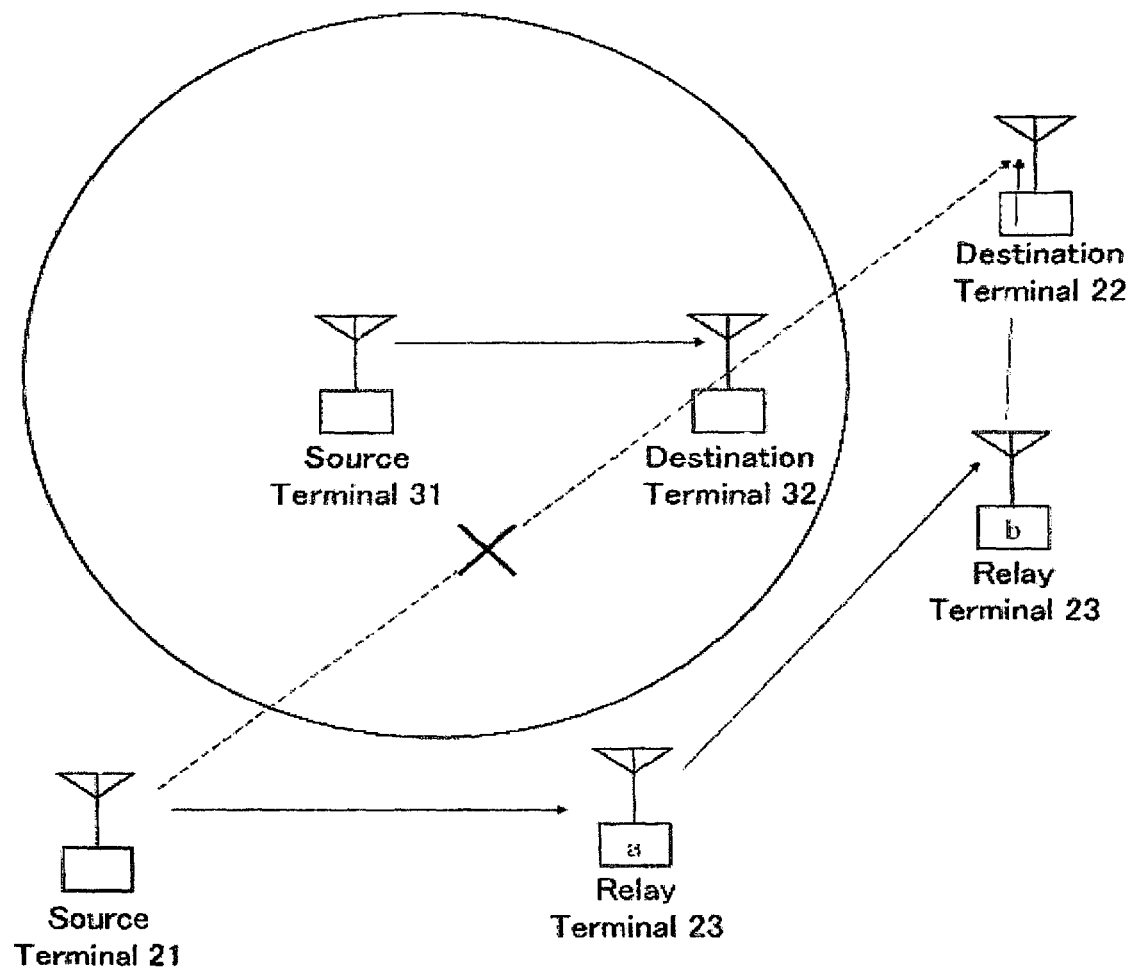
FIG. 7 shows the problems in a multi-hop communication method according to the past invention.

FIGS. 5 and 6 show flow charts for the process of a multi-hop communication method according to the present invention.

As shown in FIG. 5, the frequency scanning section 101 of the source terminal 11 scans the surrounding space and looks for available frequencies prior to communication (S101). Assuming a plurality of available channels is detected, the use channel candidate determining section 102 determines a use channel candidate from these channels (S102). The table framing section 103 makes the table TBL (S103) and stores it in the table memory 104 (S104). The source terminal 11 writes the table TBL in the header of the data packet and sends it toward the destination terminal 12 from the transmitter section 108 (S105). The source terminal 11 initiates transmission using the channel with the highest adoption rank order (the frequency with the least interference), for example. When a signal is received ("Yes" at S202), the relay terminal 13 (the relay terminals A, B and C in FIG. 4(A)) determines whether it is a data packet or a control packet (S203). When it is a data packet ("Yes" at S203), the relay terminal 13 receives the data packet (S204), extracts the table TBL from the data packet and stores it in the table memory 104 (S205), and then the process is returned to the receiving stand-by state of S201. When it is determined as a control packet at S203 ("No" at S203), the relay terminal 13 receives the control packet (S206) and invokes the table TBL (S207). The channel scanning section 101 scans the surrounding space prior to communication (S208), determines an available channel from the channel candidates by referring to the table TEL (S209), and sends the control packet and the data packet (S210).

Since the process in the relay terminals A and B and the process in the relay terminals C are identical in the flow charts in FIG. 5 and FIG. 6, the common reference numerals representing the steps in the flow charts are used.

As shown in FIG. 6, the destination terminal 12 in the stand-by state (S301 and "No" at S302) sends ACK (S303) when a data packet is received ("Yes" at S302). The destination terminal 12 sends NACK toward the source terminal 11 (the number of retransmission+1) times when the received packet includes an error, however, for the sake of simplicity the case of no error in the data packet will be explained in FIG. 6. The destination terminal 12 can send in the frequency of a sent packet as the relay terminal 13 selected the frequency. However since the relay terminal 13 already has the table TBL, the table TBL can be used for channel selection as explained below.

When the relay terminal 13 in the stand-by state (S401 and "No" at S402) receives ACK ("yes" at S402), the relay terminal 13 invokes the information on the channel used at the time of sending the data packet (this information is stored in a memory) and sends ACK using this channel.

When there is an existing system in the surroundings (a wireless system operating in the surroundings), a channel can be selected by referring to the table TBL. As before mentioned, the relay terminal 13 does not send ACK when it receives ACK first time and sends ACK (s) at second reception and later (sends (k−1) ACKs at $k^{th}$ ACK reception).

In the abovementioned case, when the source terminal 11 sends a data packet to the destination terminal 12, the relay terminals A and B relay (send) the data at the first retransmission, the relay terminal C relays (sends) the data at the second retransmission and the data is transmitted to the destination terminal 12 at the third retransmission.

Actually, the number of retransmissions can be often more than three and it is supposed that two or more relay terminals relay the data at each retransmission. At a certain retransmission, the relay terminal L can reduce errors by receiving packets from plural (not necessarily two) relay terminals. The receiving relay terminals at this retransmission can be plural (L, M, N, etc.) and these terminals L, M and N send packets.

When ACK is returned to the source terminal 11 from the destination terminal 12, the relay terminal for the return route is not necessarily the same as the relay terminal used for transmission.

According to the aforementioned example, the data packets are transmitted on the route of the source terminal 11→the relay terminals A,B→the relay terminal C→the destination terminal 12 in case of data packet sending, and ACK is transmitted on the route of the destination terminal 12→the relay terminal C→the relay terminals A,B→the source terminal 11 or on the route of the destination terminal 12→the relay terminal C→the relay terminals B→the source terminal 11.

The use channel selection can be changed according to the kind of the table TBL when ACK is relayed by the terminal that has been the relay terminal used for data packet sending (the terminal stored in the table TBL). In case of selecting the use channel based on the number of retransmissions according to TBL by using the tables TBL1, TBL3 and TBL5 shown in FIGS. 4 (A), (C) and (E), the transmission channel can be changed by the number of ACK retransmissions in this order in the same manner as data packet sending, and the transmission channel can be also changed by ((the number of retransmission of the source terminal when packet data arrived at the destination terminal)−(the number of ACK retransmissions)).

Since the plural relay terminals receiving ACK can send ACK simultaneously at the same frequency in this case, it is especially most appropriate to use STBC for sending and it can reduce the effect of interference even when STBC is not used for sending.

When a channel is autonomously selected at a terminal by using TBL2 or TBL4 in FIGS. 3(B), (D), ACK can be sent on the channel used for data packet sending or a vacant channel with the highest order in the table when scanning the channel again.

When ACK is sent to the terminal surrounding the destination terminal that did not contribute for relaying, ACK can be transmitted by determining the channel as in the case of data packet transmission by inserting the table TBL in ACK packet.

By the process in the above, ACK is returned to the source terminal 11. The source terminal 11 determines whether it receives ACK from the receiver terminal 12 within a predetermined time.

When ACK is received ("Yes" at S108), the process ends (S109). When the source terminal 11 receives NACK or the source terminal 11 does not receive ACK within the predetermined time ("No" at S108), the source terminal 11 sends control packets and a data packet (S105). The number of control packets is the same as the number the packet retransmissions when the number of the packet transmissions is equal to the predetermined retransmission times or less.

For example, when the number of packet retransmissions is two, two control packets are sent. Since the number of retransmissions increases by one, the source terminal 11 sends control packets and one data packet. The number of control packets is the same as the number of retransmission that was incremented by one.

When the source terminal 11 does not receive ACK during a predetermined retransmissions, the packets are destroyed and the process ends.

The invention claimed is:

1. A multi-hop communication method wherein a source terminal transmits and receives packets with a destination terminal through at least one relay terminal, wherein the source terminal scans receiving radio waves and detects channels which surrounding systems use and determines use channel candidates based on scan results and a table is made to refer to the use channel candidates and the table is implanted in a packet and transmitted to the relay terminal and the destination terminal, wherein the relay terminal and the destination terminal includes a table of use channel candidates extracted from the packet that is made and sent by the source terminal, wherein the relay terminal and the destination terminal selects a use channel for sending data packets from the channel candidates registered in the table and sends the data packets, wherein the destination terminal has a table for sending an ACK (Acknowledgement) packet or a NACK (Negative Acknowledgement) packet to the source terminal through the relay terminal, and wherein the destination terminal selects a use channel from the use channel candidates registered in the table and sends a confirmation packet, and the relay terminal selects a use channel from the channel candidates registered in the table and sends the confirmation packet.

2. A multi-hop communication method according to claim 1, wherein the packets are retransmitted repeatedly from the source terminal to the destination terminal via the relay terminal by a distributed Automatic Repeat request method, and wherein the relay terminal autonomously forms a transmission route and retransmits in response to a packet retransmission from the source terminal.

3. A multi-hop communication method according to claim 2, wherein the packets are sent by a space time block coding method.

4. A multi-hop communication method according to claim 1, wherein the source terminal selects the use channel from the channel candidates registered in the table, and sends the data packets.

5. A multi-hop communication method according to claim 1, wherein the use channel candidates are frequency candidates, candidates of sub-carrier pattern and candidates of time slot, used for data transmission.

6. A multi-hop communication method according to claim 1, wherein a predetermined number of the relay terminals work as branches for cooperative diversity by a space time block coding.

7. A multi-hop communication method according to claim 1, wherein the table is included in the packets and sent from the source terminal to the relay terminals and the destination terminal.

8. A multi-hop communication method according to claim 1, wherein an adoption rank order of the use channel candidates is included in the table, and the relay terminals, the destination terminal or the source terminal selects a channel from the use channel candidates according to the adoption rank order.

9. A multi-hop communication terminal used as a source terminal, a destination terminal or a relay terminal, comprising:
    a channel scanning section,
    a use channel candidate determining section,
    a table framing section,
    a table memory,
    a table implanting section,
    a table extracting section,
    a use channel selecting section,
    a transmitter section, and
    a receive section, wherein
    the channel scanning section scans a receiving radio wave and detects a channel which a surrounding system uses when the multi-hop communication terminal functions as the source terminal, the destination terminal or the relay terminal,
    the use channel candidate determining section determines use channel candidates based on a scan result of the channel scanning section when the multi-hop communication terminal functions as the source terminal,
    the table framing section makes a table to refer to the channel determined by the use channel candidate determining section when the multi-hop communication terminal functions as the source terminal or the destination terminal,
    a table memory stores the table made by the table framing section when the multi-hop communication terminal functions as the source terminal, while the table memory stores a table extracted by the table extracting section when the multi-hop communication terminal functions as the relay terminal or the destination terminal,
    the table implanting section implants the table made by the table framing section in a packet when the multi-hop communication terminal functions as the source terminal and transmits the packet to another multi-hop communication terminal functioning as the relay terminal or the destination terminal,
    the table extracting section extracts the table from the packet received from the another multi-hop communication terminal functioning as the source terminal when the multi-hop communication terminal functions as the relay terminal or the destination terminal, and
    the use channel selecting section selects a use channel from the table stored in the table memory when the multi-hop communication terminal functions as the source terminal, the relay terminal or the destination terminal.

10. A non-transitory computer-readable medium storing a multi-hop communication program, loaded in a multi-hop communication terminal used as a source terminal, a relay terminal or a destination terminal, the multi-hop communication program causing the multi-hop communication terminal to execute:
    a channel scanning step,
    a use channel candidate determining step,
    a table framing step,
    a table storage step,
    a table implanting step,
    a table extracting step,
    a use channel selecting step,
    a transmitting step, and
    a receiving step, wherein
    in the channel scanning step, a receiving radio wave is scanned and a channel which a surrounding system uses is detected when the multi-hop communication terminal functions as the source terminal, the destination terminal or the relay terminal,
    in the use channel candidate determining step, the use channel candidate is determined based on a scan result of the channel scanning step when the multi-hop communication terminal functions as the source terminal,
    in the table framing step, making a table for referring to the channel determined by the use channel candidate determining step when the multi-hop communication terminal functions as the source terminal or the destination terminal,
    in the table storage step, storing the table made by the table framing step in a table memory when the multi-hop communication terminal functions as the source terminal and storing a table extracted by the table extracting step when the multi-hop communication terminal functions as the relay terminal or the destination terminal,
    in the table implanting step, implanting the table made by the table framing step in a packet when the multi-hop communication terminal functions as the source terminal and transmitting the packet to another multi-hop communication terminal functioning as the relay terminal or the destination terminal, in the table extracting step, extracting the table from the packet received from the another multi-hop communication terminal functioning as the source terminal when the multi-hop communication terminal functions as the relay terminal or the destination terminal, and in the use channel selecting step, selecting a use channel from the table stored in the table memory when the multi-hop communication terminal functions as the source terminal, the relay terminal or the destination terminal.

11. A multi-hop communication method wherein a source terminal transmits and receives packets with a destination terminal through at least one relay terminal, comprising:

a channel scanning step,
a use channel candidate determining step,
a table framing step,
a table storage step,
a table implanting step,
a table extracting step,
a use channel selecting step,
a transmitting step, and
a receiving step, wherein in the channel scanning step, a receiving radio wave is scanned and a channel which a surrounding system uses is detected by the source terminal, the destination terminal or the relay terminal, in the use channel candidate determining step, the use channel candidate is determined by the source terminal, based on a scan result of the channel scanning step, in the table framing step, the source terminal or the destination terminal makes a table for referring to the channel determined by the use channel candidate determining step:

in the table storage step, the source terminal stores the table made by the table framing step, while the relay terminal or the destination terminal stores a table extracted by the table extracting step, in the table implanting step, the source terminal implants the table made by the table framing step in a packet and transmits the packet to the relay terminal or the destination terminal, in the table extracting step, the relay terminal or the destination terminal extracts the table from the packet received from the source terminal, and in the use channel selecting step, the source terminal, the relay terminal or the destination terminal selects a use channel from the table.

* * * * *